United States Patent
Willis et al.

(10) Patent No.: US 12,380,097 B2
(45) Date of Patent: Aug. 5, 2025

(54) MULTI-DIGITAL AGENT ARCHITECTURE WITH QUERY-ENHANCED DIGITAL AGENT SELECTION MECHANISM

(71) Applicant: PocketNest, Inc., Royal Oak, MI (US)

(72) Inventors: Jessica Willis, Huntington Woods, MI (US); Chris Wascha, Birmingham, MI (US); Yiping Kang, Ann Arbor, MI (US); Jason Mars, Ann Arbor, MI (US)

(73) Assignee: PocketNest, Inc., Royal Oak, MI (US)

( * ) Notice: Subject to any disclaimer, the term of this patent is extended or adjusted under 35 U.S.C. 154(b) by 0 days.

(21) Appl. No.: 19/079,698

(22) Filed: Mar. 14, 2025

(65) Prior Publication Data

US 2025/0209067 A1   Jun. 26, 2025

Related U.S. Application Data

(63) Continuation-in-part of application No. 18/796,675, filed on Aug. 7, 2024.

(60) Provisional application No. 63/764,964, filed on Feb. 28, 2025.

(51) Int. Cl.
  *G06F 16/242*  (2019.01)
  *G06F 16/28*   (2019.01)
  *G06F 40/20*   (2020.01)

(52) U.S. Cl.
  CPC ........ *G06F 16/2438* (2019.01); *G06F 16/285* (2019.01); *G06F 40/20* (2020.01)

(58) Field of Classification Search
  CPC ............... G06F 16/2438; G06F 16/285; G06F 16/3329; G06F 16/90332; G06F 40/20; G06F 40/285; G06F 40/35; G06F 40/40; G06N 5/04; G06N 20/00
  See application file for complete search history.

(56) References Cited

U.S. PATENT DOCUMENTS

| | | | |
|---|---|---|---|
| 11,550,831 B1 * | 1/2023 | Marks | G06N 20/00 |
| 12,254,029 B1 * | 3/2025 | Veillon | G06F 16/248 |
| 2024/0194194 A1 * | 6/2024 | Venkateswaran | G10L 15/22 |
| 2024/0404687 A1 * | 12/2024 | Bell | G06Q 10/0633 |

* cited by examiner

*Primary Examiner* — Robert W Beausoliel, Jr.
*Assistant Examiner* — Cheryl M Shechtman
(74) *Attorney, Agent, or Firm* — Padowithz Alce; Alce PLLC

(57) ABSTRACT

A system for query-enhanced digital agent selection within a multi-digital agent architecture is described. The system may include one or more processors, a graphical user interface module rendering an interactive agent querying interface for receiving unrefined query data, and a dynamic query enhancement microservice for transforming the unrefined query data to enhanced query data. The system may further include a multi-agent arbiter communicably interposed between the dynamic query enhancement microservice and a set of digital agents, the multi-agent arbiter for selecting a digital agent of the set to receive an agent selection control signal from the multi-agent arbiter and for forwarding the enhanced query data to the selected digital agent. The selected digital agent may generate a response to the unrefined query data based on a processing of the enhanced query data against data accessed within a computer data source to which the selected digital agent is specifically permissioned.

20 Claims, 6 Drawing Sheets

MULTI-DIGITAL AGENT ARCHITECTURE WITH QUERY-ENHANCED DIGITAL AGENT SELECTION MECHANISM

CROSS-REFERENCE TO RELATED APPLICATIONS

This application claims the benefit of U.S. Provisional Application No. 69/387,037, filed on 28 Feb. 2025, and is a Continuation-in-Part of U.S. patent application Ser. No. 16/864,599, filed 1 May 2020, which are incorporated in their entireties by this reference.

TECHNICAL FIELD

This invention relates generally to a multi-digital agent architecture and more specifically, to a system architecture that supports selection between multiple digital agents based on reception of a query.

BACKGROUND

Conversational artificial intelligence (AI) systems are designed to process user queries expressed in a natural language and generate responses through the application of language models. In certain implementations, these systems utilize a single language model for query processing. However, the complexity and variability of user queries may surpass the processing capabilities of a single language model, resulting in suboptimal or inaccurate responses. Thus, techniques that enhance the adaptability and scalability of conversational AI systems may improve response accuracy and overall system performance. The techniques described herein improve query processing by enhancing a system's capability to generate precise and contextually relevant responses.

BRIEF SUMMARY OF THE INVENTION(S)

In some embodiments, a system for query-enhanced digital agent selection within a multi-digital agent architecture may comprise: one or more processors; a graphical user interface module rendering, via a computer network, an interactive agent querying interface for receiving unrefined query data; a dynamic query enhancement microservice comprising: a first operable communication connection to the one or more processors of the system that: obtain the received unrefined query data from the interactive agent querying interface; convert the unrefined query data to a set of embeddings; construct a database search query using the set of embeddings and one or more logical search parameters; execute a search of a computer database using the database search query; extract historical user dialogue data from the computer database based at least in part on executing the search; and construct a rephrasing engine prompt using the extracted historical user dialogue data and the unrefined query data; and transmit the rephrasing engine prompt to a rephrasing engine; the rephrasing engine comprising an operable communication connection to a first language model that transforms the unrefined query data to enhanced query data restructured based on processing the rephrasing engine prompt, wherein the dynamic query microservice transmits the enhanced query data output by the rephrasing engine to the multi-agent arbiter; the multi-agent arbiter communicably interposed between the dynamic query enhancement microservice and a plurality of digital agents, the multi-agent arbiter in selective operable control of the plurality of distinct agents, the multi-agent arbiter comprising: a second language model that generates at least one digital agent selection inference based on an input of an agent selection prompt comprising at least the enhanced query data; one or more memories specially encoded with executable digital agent selection logic; and a second operable communication connection to the one or more processors of the system that: receive the enhanced query data from the multi-agent arbiter; process the enhanced query data via the second language model to generate the at least one digital agent classification inference; extract the executable digital agent selection logic from the one or more memories; and apply the executable digital agent selection logic to the at least one digital agent classification inference; wherein the multi-agent arbiter converts the at least one digital agent classification inference to an agent selection control signal that, when executed by the one or more processors of the system, instantiates a selected digital agent of the plurality of digital agents for automatically executing one or more computer-based operations based on receiving the enhanced query data; and a plurality of computer data sources electronically accessible to the plurality of digital agents, wherein: the selected digital agent of the plurality of digital agents is specifically permissioned to one computer data source of the plurality of data sources, the selected digital agent generates a response to the unrefined query data based on a processing of the enhanced query data against data accessed within the one computer data source, and the response is transmitted over the computer network to the interactive agent querying interface.

In some embodiments, the system may further comprise: the plurality of digital agents, each of the plurality of digital agents comprising: a respective one or more agent-specific processors that: access the data within the one computer data source to which the selected digital agent is permissioned; and construct a language model prompt from the accessed data and the enhanced query data; provide the language model prompt to the digital agent; and a respective operable communication connection to a respective third language model, wherein the respective third language model of the selected digital agent generates the response to the unrefined query data based on processing the language model prompt, and wherein the digital agent transmits the response to the interactive agent querying interface.

In some embodiments, the system may further comprise: one or more memories electronically accessible to the plurality of digital agents, wherein the one or more agent-specific processors of the selected digital agent further: retrieve, from the one or more memories, first textual data comprising a first textual description of a role of the selected digital agent; retrieve, from the one or more memories, second textual data comprising a second textual description of a set of rules for the selected digital agent to follow, wherein the language model prompt is further constructed from the first textual description and the second textual description.

In some embodiments, the system may further comprise: one or more memories electronically accessible to the multi-agent arbiter, wherein the one or more processors of the system further: retrieve, from the one or more memories and for each digital agent of the plurality of digital agents, respective textual data comprising a description of the digital agent; and provide, to the second language model, the respective textual data for each of the plurality of digital agents.

In some embodiments, the system may further comprise: one or more reference memories electronically accessible to the second language model, wherein the one or more processors of the system further: retrieve, from the second language model, sets of embeddings based at least in part on providing the respective textual data for each of the plurality of digital agents to the second language model; store the sets of embeddings at the one or more reference memories; retrieve the sets of embeddings from the one or more reference memories; provide, to the second language model, the sets of embeddings, wherein processing the enhanced query data via the second language model to generate the at least one digital agent classification inference is based at least in part on the provided sets of embeddings.

In some embodiments of the system, the one or more processors may further: store the unrefined query data and the set of embeddings at the computer database.

In some embodiments of the system, the one or more processors may further: convert the response to the unrefined query data to a second set of embeddings; and store the response to the unrefined query data and the second set of embeddings at the computer database.

In some embodiments of the system, the graphical user interface module: provides, to the interactive agent querying interface, a display section that displays textual data of the unrefined query data and the response to the unrefined query data; provides, to the interactive agent querying interface, a user interface input element that stores the textual data of the unrefined query data when manipulated by user input; and provides, to the interactive agent querying interface, a user interface control element that triggers transmission of the unrefined query data when manipulated by user input.

In some embodiments of the system, the selected digital agent and a second digital agent of the plurality of digital agents are each specifically permissioned to the one computer data source of the plurality of data sources.

In some embodiments of the system, the selected digital agent of the plurality of digital agents is specifically permissioned to the one computer data source and another computer data source of the plurality of computer data sources, and the selected digital agent generates the response to the unrefined query data based on a processing of the enhanced query data against the data accessed within the one computer data source and additional data accessed within the other computer data source.

In some embodiments of the system, the data accessed within the one computer data source comprises user-specific information, a second digital agent of the plurality of digital agents is specifically permissioned to another computer data source of the plurality of computer data sources distinct from the one computer data source, and data stored within the other computer data source is accessible for multiple users.

In some embodiments, the system further comprises: an authentication module comprising: a third operable communication connection to the one or more processors of the system that: extract, from the unrefined query data, an identifier of a user of the interactive agent querying interface, wherein searching the computer database comprises searching entries of the computer database that have the identifier of the user, and wherein each instance of the historical user dialogue data has a corresponding entry in the computer database with the identifier of the user.

In some embodiments, an adaptive query data processing service that is implemented by a network of distributed computers may comprise: one or more processors; a graphical user interface module rendering, via a computer network, an interactive agent querying interface for receiving unrefined query data; a dynamic query enhancement microservice comprising: a first operable communication connection to the one or more processors of the adaptive query data processing service that: obtain the received unrefined query data from the interactive agent querying interface; convert the unrefined query data to a set of embeddings; construct a database search query using the set of embeddings and one or more logical search parameters; execute a search of a computer database using the database search query; extract historical user dialogue data from the computer database based at least in part on executing the search; and construct a rephrasing engine prompt using the extracted historical user dialogue data and the unrefined query data; and transmit the rephrasing engine prompt to a rephrasing engine; the rephrasing engine comprising an operable communication connection to a first language model that transforms the unrefined query data to enhanced query data restructured based on processing the rephrasing engine prompt, wherein the dynamic query microservice transmits the enhanced query data output by the rephrasing engine to the multi-agent arbiter; the multi-agent arbiter communicably interposed between the dynamic query enhancement microservice and a plurality of digital agents, the multi-agent arbiter in selective operable control of the plurality of distinct agents, the multi-agent arbiter comprising: a second language model that generates at least one digital agent selection inference based on an input of an agent selection prompt comprising at least the enhanced query data; one or more memories specially encoded with executable digital agent selection logic; and a second operable communication connection to the one or more processors of the adaptive query data processing service that: receive the enhanced query data from the rephrasing engine; process the enhanced query data via the second language model to generate the at least one digital agent classification inference; extract the executable digital agent selection logic from the one or more memories; and apply the executable digital agent selection logic to the at least one digital agent selection inference; wherein the multi-agent arbiter converts the at least one digital agent selection inference to an agent selection control signal that, when executed by the one or more processors of the adaptive query data processing service, instantiates a selected digital agent of the plurality of digital agents for automatically executing one or more computer-based operations based on receiving the enhanced query data; and a plurality of computer data sources electronically accessible to the plurality of digital agents, wherein: the selected digital agent of the plurality of digital agents is specifically permissioned to one computer data source of the plurality of data sources, the selected digital agent generates a response to the unrefined query data based on a processing of the enhanced query data against data accessed within the one computer data source, and the response is transmitted over the computer network to the interactive agent querying interface.

In some embodiments, the adaptive query data processing service may further comprise: the plurality of digital agents, each of the plurality of digital agents comprising: a respective one or more agent-specific processors that: access the data within the one computer data source to which the selected digital agent is permissioned; and construct a language model prompt from the accessed data and the enhanced query data; provide the language model prompt to the digital agent; and a respective operable communication connection to a respective third language model, wherein the respective third language model of the selected digital agent generates the response to the unrefined query data based on processing the language model prompt, and wherein the digital agent transmits the response to the interactive agent querying interface.

In some embodiments, the adaptive query data processing service may further comprise: one or more agent-specific memories electronically accessible to the selected digital agent, wherein the one or more agent-specific processors of the selected digital agent further: retrieve, from the one or more agent-specific memories, first textual data comprising a first textual description of a role of the selected digital agent; retrieve, from the one or more agent-specific memories, second textual data comprising a second textual description of a set of rules for the selected digital agent to follow, wherein the language model prompt is further constructed from the first textual description and the second textual description.

In some embodiments, the adaptive query data processing service may further comprise: one or more memories electronically accessible to the multi-agent arbiter, wherein the one or more processors of the adaptive query data processing service further: retrieve, from the one or more memories and for each digital agent of the plurality of digital agents, respective textual data comprising a description of the digital agent; and provide, to the second language model, the respective textual data for each of the plurality of digital agents.

In some embodiments, the adaptive query data processing service may further comprise: one or more reference memories electronically accessible to the second language model, wherein the one or more processors of the adaptive query data processing service further: retrieve, from the second language model, sets of embeddings based at least in part on providing the respective textual data for each of the plurality of digital agents to the second language model; store the sets of embeddings at the one or more reference memories; retrieve the sets of embeddings from the one or more reference memories; provide, to the second language model, the sets of embeddings, wherein processing the enhanced query data via the second language model to generate the at least one digital agent classification inference is based at least in part on the provided sets of embeddings.

In some embodiments of the adaptive query data processing service, the one or more processors further: store the unrefined query data and the set of embeddings at the computer database.

In some embodiments of the adaptive query data processing service, the one or more processors further: convert the response to the unrefined query data to a second set of embeddings; and store the response to the unrefined query data and the second set of embeddings at the computer database.

In some embodiments, a computer-implemented system for query-enhanced digital agent selection within a multi-digital agent architecture may comprise: one or more processors; a computer-readable medium operably coupled to the one or more processors, the computer-readable medium having computer-readable instructions stored thereon that, when executed by the one or more processors, cause a computing device to perform operations comprising: obtaining, via a computer network, unrefined query data from an interactive agent querying interface rendered by a graphical user interface module; converting the unrefined query data to a set of embeddings; constructing a database search query using the set of embeddings and one or more logical search parameters; executing a search of a computer database using the database search query; extracting historical user dialogue data from the computer database based at least in part on executing the search; constructing a rephrasing engine prompt using the extracted historical user dialogue data and the unrefined query data; transmitting, to a rephrasing engine, the rephrasing engine prompt; receiving, from the rephrasing engine, enhanced query data, the enhanced query data restructured from the unrefined query data; processing the enhanced query data via a language model to generate at least one digital agent classification inference based at least in part on an input of an agent selection prompt comprising at least the enhanced query data to the language model; extracting executable digital agent selection logic from one or more memories specially encoded with the executable digital agent selection logic; applying the executable digital agent selection logic to the at least one digital agent selection inference; converting the at least one digital agent selection inference to an agent selection control signal based at least in part on applying the executable digital agent selection logic; executing the agent selection control signal to instantiate a selected digital agent of a plurality of digital agents for automatically executing one or more computer-based operations based on receiving the enhanced query data; transmitting the enhanced query data to the selected digital agent; retrieving, from the selected digital agent, a response to the unrefined query data based at least in part on providing the enhanced query data to the selected digital agent; and transmitting, via the computer network, the response to the unrefined query data to the interactive agent querying interface.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1.00 System

Figure 1:
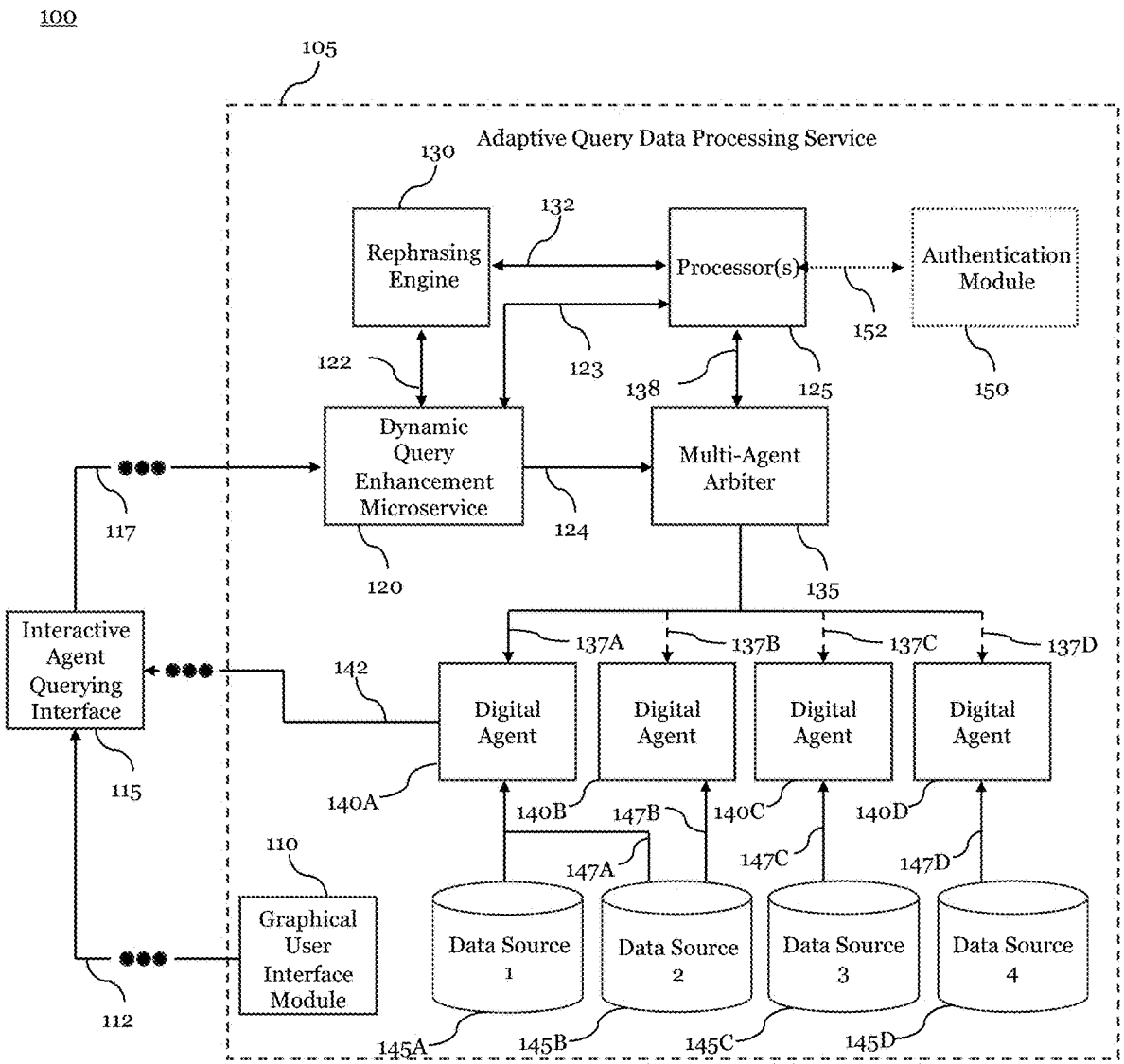
FIG. 1 illustrates a schematic representation of a system 100 in accordance with one or more embodiments of the present application.

As shown in FIG. 1, a system 100 may include an adaptive query data processing service 105 and an interactive agent querying interface 115. The adaptive query data processing service 105 and the interactive agent querying interface 115 may communicate via a computer network (e.g., via transmission of packets between the interactive agent querying interface 115 and the adaptive query data processing service 105 over a communication connection). For instance, adaptive query data processing service 105 may communicate with interactive agent querying interface 115 via one or more of communication connections 112, 117, and 142. A "communication connection" as described herein may refer to a wireless or wired channel that may be direct (e.g., directly between two devices) or indirect (e.g., involve multiple computers and/or processors within a computer network being used to relay information between two devices). In some examples, the interactive agent querying interface 115 may be located on a display device separate from but in communication with the adaptive query data processing service 110. The term "computer network" may refer to a system of interconnected computing devices configured to communicate with each other.

The systems and techniques described herein may be associated with one or more advantages as compared to other systems. For instance, the multi-agent arbiter described herein may be used to instantiate one digital agent of a group of digital agents and may forward query data to the one instantiated digital agent, where each digital agent may include one or more dedicated processors and one or more dedicated memories. Other techniques that do not employ a multi-agent arbiter may provide query data to all the digital agents in a group of digital agents. The processors of all digital agents performing operations in response to receiving query data may have increased energy consumption and may use an increased number of computational resources as compared to using processors of only one digital agent. Additionally, the cumulative uptime associated with using the processors of all digital agents may be increased as compared to the uptime associated with using processors of a single digital agent.

Additionally, the multi-agent arbiter may enable scalable digital agent selection. For instance, if a first user provides a user query whose associated query data is forwarded to a first digital agent and a second user provides a user query whose associated query data is forwarded to a second digital agent, a first digital response for the first digital agent and a second digital response for the second digital agent may be generated in parallel. By contrast, systems that forwards query data associated with a user query to all digital agents may not be capable of generating digital responses for multiple user queries in parallel. Thus, the techniques described herein may enable efficient parallelization of the digital agents.

1.05 Adaptive Query Data Processing Service

As shown in FIG. 1, an adaptive query data processing service 105 may include a graphical user interface module 110, a dynamic query enhancement microservice 120, processor(s) 125, a rephrasing engine 130, a multi-agent arbiter 135, digital agents 140A through 140D, and data sources 145A through 145D. In some examples, the adaptive query data processing service 105 may additionally include an authentication module 150. Each of the components of adaptive query data processing service 110 may be referred to as "modules", "components", or "elements" without deviating from the scope of the present disclosure.

In some examples, each of at least a portion of the components of adaptative query data processing service 105 may be executed by a respective set of computers within a distributed network of computers (e.g., a cloud-based system). Additionally, or alternatively, each of at least a portion of the components of adaptive query data processing service 105 may be located on a single controller or may be located on any combination of multiple controllers configured to communicate with each other.

In some examples, adaptive query data processing service 105 may be a cloud-based application that is hosted on one or more remote servers accessible via the interactive agent querying interface 115. In such examples, the interactive agent querying interface 115 may interact with the adaptive query data processing service 110 using one or more network protocols (e.g., a Wireless Fidelity (Wi-Fi) protocol). The adaptive query data processing service 105 may provide the interactive agent querying interface 115 to a user upon establishment of an initial connection with the adaptive query data processing service 105 using the one or more network protocols. Accordingly, it shall be recognized that the modules of the adaptive query data processing service 105 may be executed by the one or more network of computers or servers, which may be specifically programmed or encoded to perform the several operations for generating a response to unrefined query data.

1.10 Graphical User Interface Module

One or more computers executing graphical user interface module 110 may function to render, via a computer network, an interactive agent querying interface 115 for receiving unrefined query data. For instance, the graphical user interface module 110 may perform server-side rendering (SSR), in which the graphical user interface module 110 may process a request from a client device (e.g., a device running a browser) and may construct a response including a fully rendered interactive agent querying interface 115. Alternatively, the graphical user interface module 110 may enable client-side rendering (CSR), in which the graphical user interface module 110 sends a script (e.g., Javascript) that renders the interactive agent querying interface 115 at the client device. Hybrid approaches may additionally be utilized, in which a portion of the rendering occurs at the graphical user interface module 110 and a script provided to the client device performs the remaining rendering. In some examples (e.g., in which a user pulls up the interactive agent querying interface 115 in a mobile or desktop application), the client device may store code (e.g., in a memory of the client device) that the client device may use to load at least a portion of the interactive agent querying interface 115. After performing any of these approaches, a user using the client device may have access to the adaptive query data processing service 105 via the interactive agent querying interface 115.

1.15 Interactive Agent Querying Interface

A client device may receive information (e.g., HTML files, CSS files, Javascript files) that the client device may use to generate interactive agent querying interface 115. Additionally, or alternatively, the client device may use information stored at the client device to generate at least a portion of the interactive agent querying interface 115. Upon generating of the interactive agent querying interface 115, a user may use the interactive agent querying interface 115 to provide a query to adaptive query data processing service 105 (e.g., in the form of unrefined query data). It should be noted that there may be examples in which the unrefined query data is provided via a command line interface (CLI) or an application programming interface (API) without deviating from the scope of the present disclosure. Additionally, or alternatively, there may examples in which queries are retrieved by the client device from a memory or computer database that the client device has access to before being provided to interactive agent querying interface 115.

Figure 6:
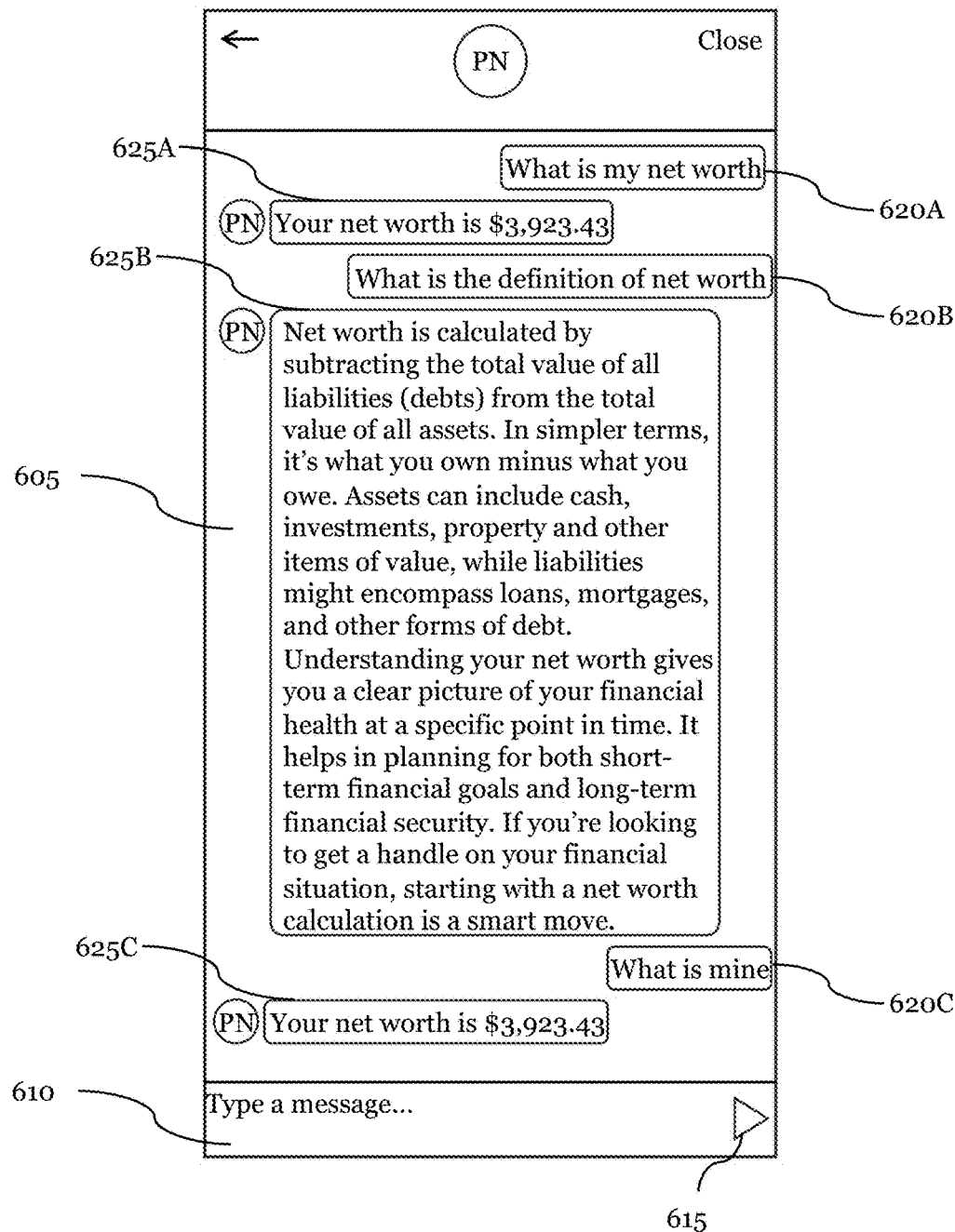
FIG. 6 illustrates an example interactive agent querying interface 600 in accordance with one or more embodiments of the present application.

In a non-limiting example, as described with reference to FIG. 6, a user may load an interactive agent querying interface 600 (e.g., via clicking a user interface input element on a browser or in a mobile or desktop application). The interactive agent querying interface 600 may include a display section 605 that displays a query provided by the user (e.g., textual data of unrefined query data) and responses to the query (e.g., a response to unrefined query data). For instance, user interface display elements 620A, 620B, and 620C may represent queries input previously by a user and user interface display elements 625A, 625B, and 625C may represent responses to each of the user-provided queries. For instance, user interface display element 625A may represent a response to the user query displayed by user interface display element 620A, user interface display element 625B may represent a response to the user query displayed by user interface display element 620B, and user interface display element 625C may represent a response to the user query displayed by user interface display element 620C.

Interactive agent querying interface 600 may further include a user interface input element 610 that stores a query (e.g., textual data of unrefined query data) when manipulated by user input. For instance, if a user types or pastes a user query into the user interface input element 610, the user interface input element 610 may store the associated data (e.g., in a memory or cache of the device hosting the interactive agent querying interface 600). Additionally, the user interface input element 610 may display the user query (e.g., until the user manipulates the user interface control element 615).

Interactive agent querying interface 600 may additionally include a user interface control element 615 that triggers the client device to transmit the query (e.g., the unrefined query data) to the adaptive query data processing service. When the user manipulates (e.g., clicks) the user interface control element 615, the user interface input element 610 may no longer display the user query. Additionally, the display section 605 may be updated to include a new user interface display element corresponding to the most recently entered user query. It should be noted that, in some examples, the user may, alternatively, trigger transmission of the query via pressing of a key (e.g., an enter key) without first manipulating the user interface control element 615.

1.20 Dynamic Query Enhancement Microservice

One or more computers executing dynamic query enhancement microservice 120 may function to convert a query received by a user (i.e., unrefined query data) to enhanced query data. The term "unrefined query data" may refer to data representing a query written in a human language in a format that is not bound by a strict, defined ruleset (e.g., not a structured query, such as a SQL query). The term "enhanced query data" may refer to query data restructured from unrefined query data via processing of the unrefined query data (e.g., processing through a rephrasing engine as described herein). To perform the conversion, the dynamic query enhancement microservice 120 may use processor(s) 125 via a first operable communication connection 123 to processor(s) 125. It should be noted that there may be examples in which the dynamic query enhancement microservice 120 includes processors that may perform the functions of processor(s) 125 without deviating from the scope of the present disclosure.

Conversion of Unrefined Query Data to Embeddings

The processor(s) 125, via the first operable communication connection 123, may obtain received unrefined query data from interactive agent querying interface 115 (e.g., via user input) and may convert the unrefined query data to a set of embeddings. The terms "set of embeddings" or "embeddings" may refer a vector representation of the unrefined query data. In some examples, the vector representation may be generated via an input of the unrefined query data to an embeddings model. An embeddings model, as described herein, may refer to a type of machine learning model that represents textual data (such as a sequence of words) as a point within a vector space. Text with higher semantic similarity may be mapped to points that are closer together in this space. As a result, embeddings models may allow for similarity comparisons by analyzing the distances between vectors. Examples of embeddings models may include Word2Vec, BERT, and fastText, among others.

Figure 2:
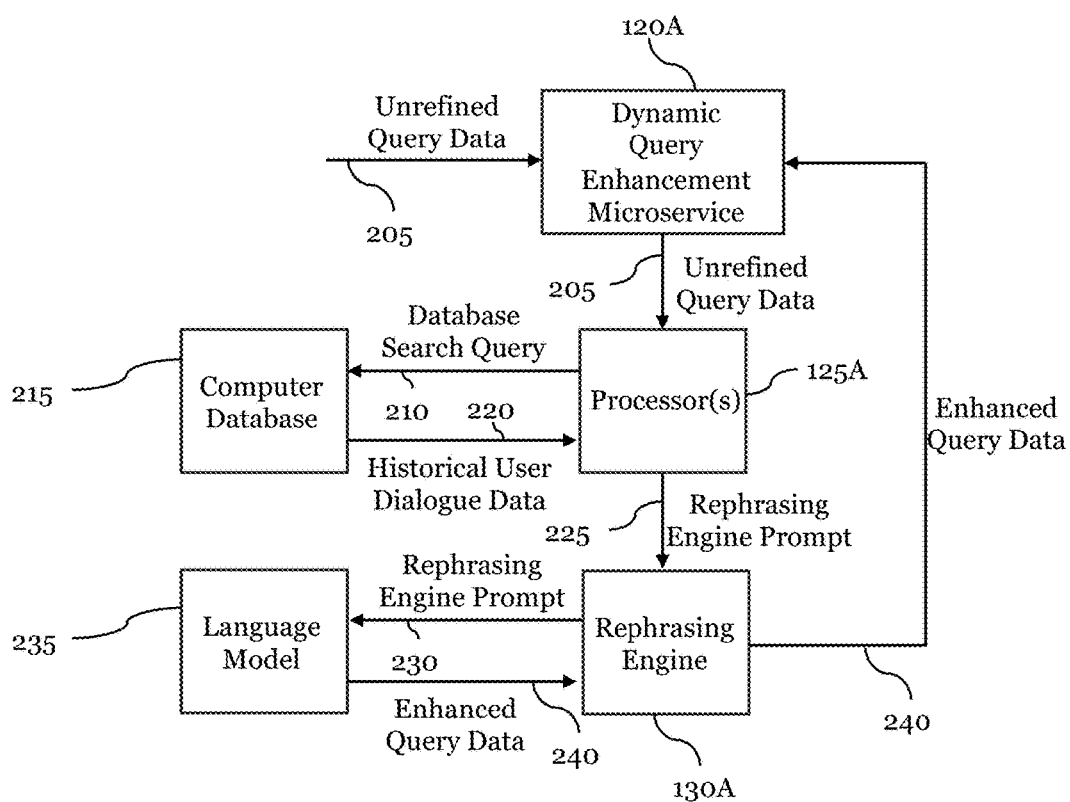
FIG. 2 illustrates an example query data refinement procedure 200 in accordance with one or more embodiments of the present application.

In a non-limiting example, as depicted in FIG. 2, dynamic query enhancement microservice 120A may receive unrefined query data 205 from an interactive agent querying interface and may relay the unrefined query data 205 to processor(s) 125A. Processor(s) 125A may convert the obtained unrefined query data 205 to a set of embeddings. It should be noted that, in some examples, dynamic query enhancement microservice 120A may be an example of a dynamic query enhancement microservice 120 as described with reference to FIG. 1 and processor(s) 125A may be an example of processor(s) 125 as described with reference to FIG. 1.

Searching a Computer Database for Historical User Dialogue Data

After converting the unrefined query data to the set of embeddings, the processor(s) 125 may construct a database search query using the set of embeddings and one or more logical search parameters. The term "logical search parameters" may refer to one or more parameters that define constraints for the search. For instance, an example of a logical search parameter may include a recency threshold (e.g., a temporal threshold) that indicates to only select data that is within a threshold time of a time associated with the database search query (e.g., a time at which the database search query is constructed, a time indicated by the database search query, a time at which the database search query is received). Alternatively, the recency threshold may indicate to only select data that is within a current session or within a threshold number of most recent sessions, where a "session" may refer to a temporary interactive exchange between a user and the adaptive query data processing service. In some examples, the database search query may have a structured format according to a predefined ruleset (e.g., the database search query may be a SQL query).

The processor(s) 125, in some examples, may execute a search of a computer database using the database search query. The term "computer database" may refer to a systematically arranged collection of data. The computer database of the present disclosure may be an example of a vector database, where a vector database may refer to a database that stores data in a vector format. A vector database may be searched using indexing techniques (e.g., Approximate Nearest Neighbor (ANN)) that enable vectors similar to a provided vector to be found without searching each entry of the vector database.

In the present disclosure, the computer database may store embeddings of historical user dialogue data, where the term "historical user dialogue data" may refer to previously received unrefined query data and responses generated for the previously received unrefined query data. Additionally, in some examples, the computer database may store the textual content of the historical user dialogue data.

To execute a search of the computer database, the processor(s) 125 may provide the set of embeddings for the unrefined query data to the computer database and may retrieve historical user dialogue data within a threshold distance of the set of embeddings. Additionally, the processor(s) 125 may filter the historical user dialogue data to conform to constraints defined by the logical search parameters (e.g., may only select historical user dialogue data that satisfies the recency threshold). By performing the search, the processor(s) may extract the historical user dialogue data from the computer database.

In a non-limiting example, as described in FIG. 2, processor(s) 125A may construct a database search query 210 using the set of embeddings of unrefined query data 205 and logical search parameters and may execute a search of computer database 215 using the database search query 210. Additionally, the processor(s) 125A may extract historical user dialogue data 220 based on executing the search.

Construction and Use of a Rephrasing Engine Prompt

After extracting the historical user dialogue data from the computer database, the processor(s) 125A may construct a rephrasing engine prompt using the extracted historical user dialogue data and the unrefined query data. The term "rephrasing engine prompt" may refer to a sequence of textual data that includes textual data of the historical user dialogue data and textual data of the unrefined query data. Constructing the rephrasing engine prompt may include combining the textual data of the historical user dialogue data and the unrefined query data.

Upon constructing the rephrasing engine prompt, the processor(s) 125A may transmit the rephrasing engine prompt to rephrasing engine 130. The transmitting may be performed over communication connection 132. Alternatively, it should be noted that there may be examples where the processor(s) 125A may transmit the rephrasing engine prompt to dynamic query enhancement microservice 120, which may forward the rephrasing engine prompt to rephrasing engine 130. For instance, processor(s) 125 may transmit the rephrasing engine prompt over communication connection 123 and dynamic query enhancement microservice 120 may forward the rephrasing engine prompt over communication connection 122.

After rephrasing engine 130 receives the rephrasing engine prompt, dynamic query enhancement microservice 120 may receive enhanced query data output by the rephrasing engine 130 and may transmit, to multi-agent arbiter 135, the enhanced query data. The enhanced query data may be transmitted via an API defined for communication between the dynamic query enhancement microservice 120 and the multi-agent arbiter 135. Additionally, or alternatively, the enhanced query data may be provided via a shared communication protocol (e.g., a wired or wireless protocol) that enables dynamic query enhancement microservice 120 to encode the enhanced query data into a signal and for multi-agent arbiter 135 to decode the signal.

In a non-limiting example, as described with reference to FIG. processor(s) 125A may construct a rephrasing engine prompt 225 and may provide the rephrasing engine prompt 225 to rephrasing engine 130A. The rephrasing engine 130A may generate enhanced query data 240 and may provide enhanced query data 240 to dynamic query enhancement microservice 120A. In some examples, rephrasing engine 130A may be an example of a rephrasing engine 130 as described with reference to FIG. 3.

1.25 Processor(s)

Computer processor(s) 125 may function to execute operations corresponding to other modules of the adaptive query data processing service 105 (e.g., dynamic query enhancement microservice 120, multi-agent arbiter 135, authentication module 150). The computer processor(s) 125 may include a single processing unit, or, alternatively, may encompass multiple processing units that function in parallel or independently. In embodiments where multiple processors are utilized, these processors may reside on the same physical host system or may be distributed across multiple host systems, potentially located in geographically disparate locations.

In certain implementations, the computer processor(s) 125 may be specifically configured to allocate specific subsets of processing units to particular functions or modules thereby forming one or more distinct microservices, which may be specifically configured with software applications, scripts, computer logic, and/or control instructions for executing the plurality of modules within the adaptive query data processing service 105. For example, a dedicated processor or subset of processors may be specifically assigned and/or programmed to perform operations associated with dynamic query enhancement microservice 120, while another processor or subset of processors may be tasked with operations associated with multi-agent arbiter 135. This modular allocation of processing resources can facilitate efficient parallel processing, reduce latency, and improve overall system throughput by ensuring that specialized processors handle designated tasks.

Additionally, the computer processor(s) 125 may be configured with various control logic and processing pipelines that optimize data flow between system components. In embodiments involving multi-core processors or multi-processor systems, individual cores or processors may be dynamically assigned to handle computationally intensive tasks. These processors may further support various modes of operation, such as single-instruction-multiple-data (SIMD) or multi-threading, enabling simultaneous processing of large datasets and further enhancing system performance.

In some instances, the computer processor(s) 125 may include specialized processors, such as graphics processing units (GPUs), tensor processing units (TPUs), or other application-specific integrated circuits (ASICs), to perform specialized functions, such as machine learning model training, large-scale data analytics, or secure computation. The inclusion of such specialized processors can further optimize the performance of the adaptive query data processing service 105 in specific application domains, ensuring that tasks requiring high computational power are executed efficiently.

1.30 Rephrasing Engine

One or more computers executing rephrasing engine 130 may function to convert a rephrasing engine prompt into enhanced query data. For instance, the rephrasing engine 130 may have a communication connection to a language model that transforms the unrefined query data (e.g., within the rephrasing engine prompt) to enhanced query data restructured based on processing the rephrasing engine prompt. A language model as described herein may refer to a machine learning model configured to process textual data representing a language. For instance, a language model may be configured to predict one or more textual outputs from a given input sequence. In the present application, a machine learning model may be configured to predict enhanced query data from a rephrasing engine prompt including unrefined query data and/or historical user dialogue data. The language model may be trained on corpus of textual data (e.g., a corpus of textual data including examples of enhanced query data and the corresponding unrefined query data and/or historical user dialogue data). It should be noted that there may be examples in which the rephrasing engine 130 includes the language model without deviating from the scope of the present disclosure. Additionally, it should be noted that the rephrasing engine prompt may be processed through the language model using processor(s) 125, processors internal to rephrasing engine 130, or processors coupled with a system that includes the language model (e.g., in examples in which the language model is on a separate system from the rephrasing engine).

In a non-limiting example, as described with reference to FIG. 2, rephrasing engine 130A may receive a rephrasing engine prompt 225 from processor(s) 125A and may provide the rephrasing engine prompt 230 to language model 235. Language model 235, in response to receiving rephrasing engine prompt 230 as an input, may output enhanced query data 240 to rephrasing engine 230. Rephrasing engine 130A may provide the enhanced query data 240 to dynamic query enhancement microservice 120A.

1.35 Multi-Agent Arbiter

One or more computers executing multi-agent arbiter 135 may function to select a digital agent to which to forward enhanced query data and to forward the enhanced query data to the selected digital agent. In a non-limiting example, as depicted in FIG. 1, multi-agent arbiter 135 may have selective operable control of digital agents 140A through 140D. For instance, the multi-agent arbiter may have a first communication connection 137A to digital agent 140A, a second communication connection 137B to digital agent 140B, a third communication connection 137C to digital agent 140C, and a fourth communication connection 137D to digital agent 140D. As depicted in FIG. 1, digital agent 137A may be the selected digital agent. Accordingly, multi-agent arbiter may forward the enhanced query data to digital agent 137A.

The multi-agent arbiter 135 may include a language model that generates at least one digital agent selection inference based on an input of an agent selection prompt including the enhanced query data. The term "digital agent selection inference" may refer to one or more outputs of the language model that the multi-agent arbiter may use to determine which digital agent to forward enhanced query data to. For instance, the digital agent selection inference may include a value (e.g., a confidence value) for each digital agent indicating a likelihood that the enhanced query data is related to the respective digital agent. The term "agent selection prompt" may refer to a sequence of textual data that includes textual data of the enhanced query data. Without deviating from the scope of the present disclosure, it should be noted that there may be examples in which the multi-agent arbiter 135 has a communication connection to the language model (e.g., in examples in which the language model is located on a separate, external system).

The multi-agent arbiter 135 may also include one or more memories specially encoded with executable digital agent selection logic. The term "digital agent selection logic" may refer to information stored within the one or more memories that processor(s) 125 may use to convert the at least one digital agent classification inference to an agent selection control signal. The information, in some examples, may include one or more parameters (e.g., thresholds or range values) that the processor(s) 125 may retrieve to determine which digital agent to generate an agent selection control signal for. Additionally, or alternatively, the information may include executable code that processor(s) 125 may execute to select a digital agent from the at least one digital agent classification inference. Additionally, or alternatively, the information may include heuristics defining a set of rules for selecting a digital agent from the at least one digital agent classification inference. Additionally, or alternatively, the information may include a machine learning model (e.g., a classification head) that the processor(s) 125 may use to process the at least one digital agent classification inference that may map the at least one digital agent classification inference to an identifier or index associated with a particular digital agent.

The multi-agent arbiter 135 may also include a communication connection to processor(s) 125 (e.g., communication connection 138), where the processor(s) 125 may receive the enhanced query data from the multi-agent arbiter and may process the enhanced query data via the language model of the multi-agent arbiter 135 to generate the at least one digital agent classification inference. The processor(s) 125 may additionally extract the executable digital agent selection logic from the one or more memories of the multi-agent arbiter 135 and may apply the executable digital agent selection logic to the at least one digital agent classification inference. By applying the executable digital agent selection logic to the at least one digital agent classification inference, the processor(s) 125 may generate an agent selection control signal that instantiates a selected digital agent of a set of digital agents (e.g., digital agent 140A) for automatically executing one or more computer-based operations based on receiving the enhanced query data. The term "agent selection control signal" may refer to a control signal that the multi-agent arbiter 135 may provide to a particular digital agent (e.g., to a processor of the digital agent) that indicates to use the digital agent.

Figure 3:
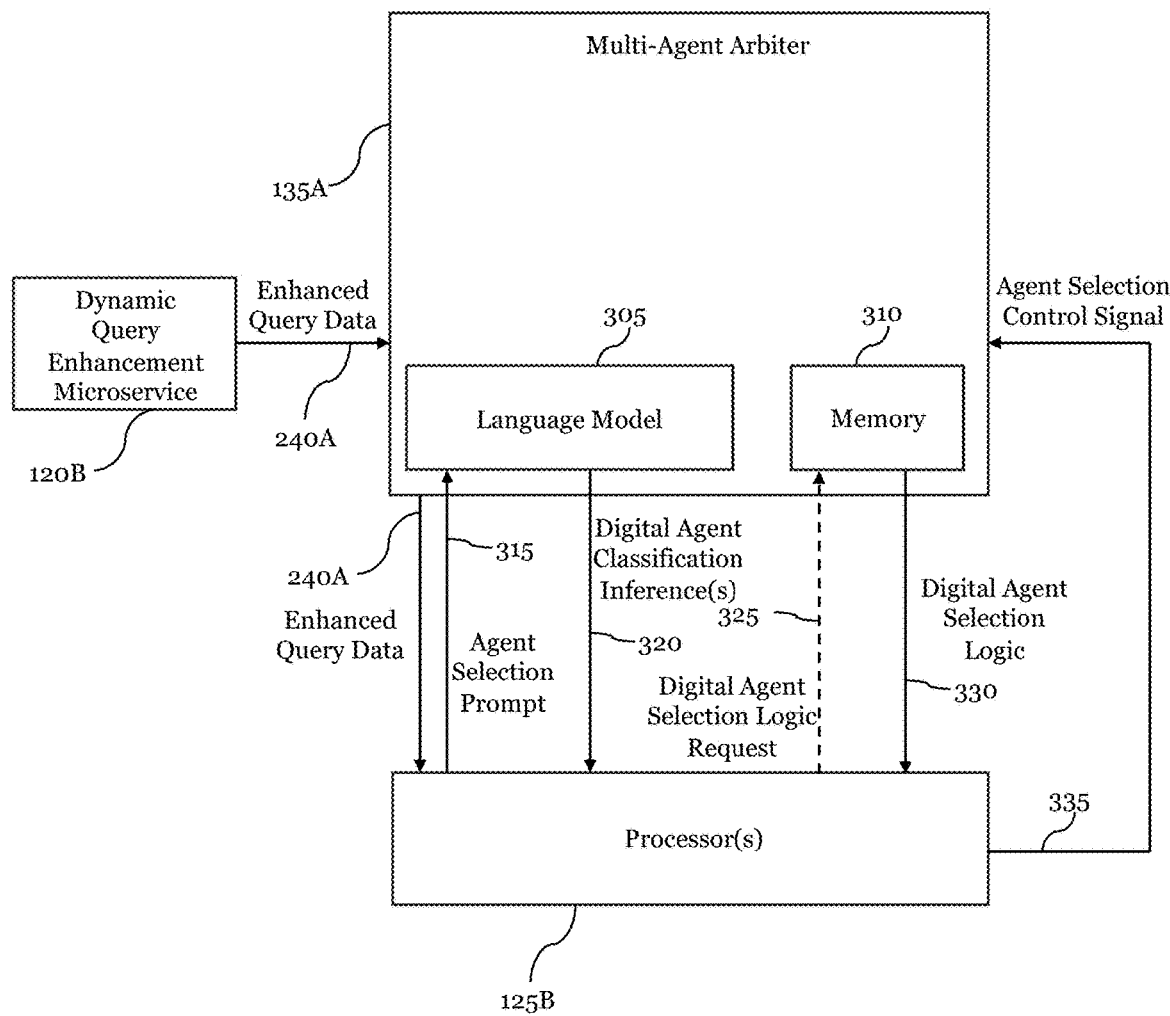
FIG. 3 illustrates an example digital agent selection procedure 300 in accordance with one or more embodiments of the present application.

In a non-limiting example, as described with reference to FIG. 3, dynamic query enhancement microservice 120B may transmit enhanced query data 240A to multi-agent arbiter 135A and multi-agent arbiter 135A may forward enhanced query data 240A to processor(s) 125B. Processor(s) 125B may provide an agent selection prompt 315 to language model 305 and may receive at least one digital agent classification inference 320 from language model 305 in response to the provided agent selection prompt 315. Processor(s) 125B may extract digital agent selection logic 330 from memory 310 (e.g., via a provision of a digital agent selection logic request 325 to memory 310) and may apply the digital agent selection logic 330 to the at least one digital agent classification inference 320 to generate an agent selection control signal 335.

Initializing the Language Model

To initialize the language model that generates the at least one digital agent classification inference, the digital agent arbiter 135 may have electronic access to a memory of adaptive query data processing service 105 from which the digital agent arbiter 135 may retrieve, for each of digital agents 140A through 140D, respective textual data including a description of the digital agent. Additionally, the digital agent arbiter 135 may provide, to the language model, the respective textual data for each of digital agents 140A through 140D. The language model, upon receiving the respective textual data, may output sets of embeddings based on the provided textual data which the digital agent arbiter 135 may retrieve. The digital agent arbiter 135 may store the sets of embeddings at one or more reference memories of the adaptive query data processing service 105.

Upon receiving enhanced query data, the digital arbiter 135 may retrieve the sets of embeddings from the one or more reference memories. The digital arbiter 135 may provide, to the language model, the sets of embeddings and may perform processing of the enhanced query data via the language model based on the provided sets of embeddings.

Figure 5:
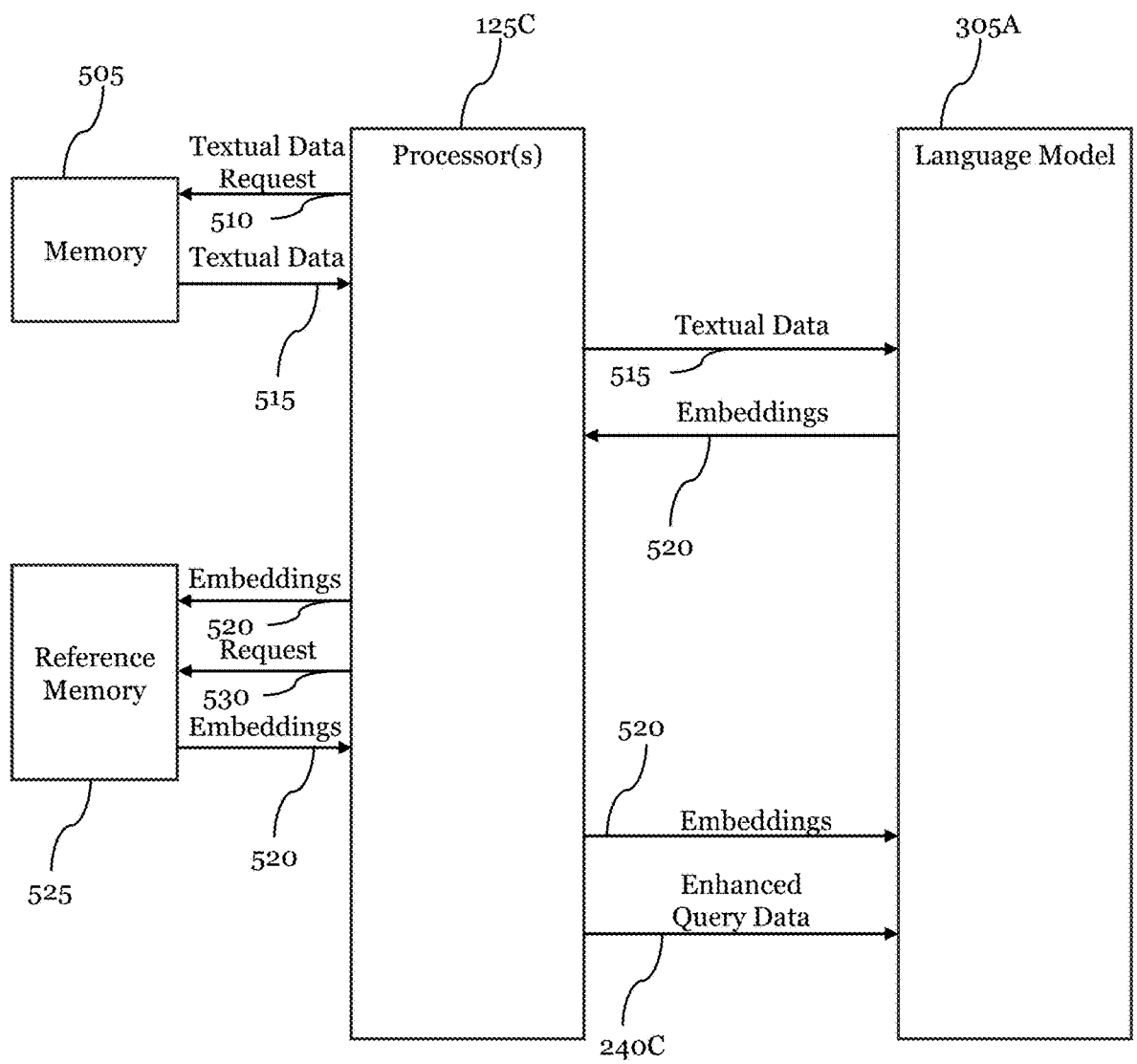
FIG. 5 illustrates an example language model initialization procedure 500 in accordance with one or more embodiments of the present application.

In a non-limiting example, as described with reference to FIG. 5, processor(s) 125C may provide, to memory 505 of an adaptive query data processing service, a textual data request 510 and may receive textual data 515 for each of a set of digital agents. The processor(s) 125C may provide the textual data 515 to language model 305A and may receive sets of embeddings 520 in response to providing the textual data 515 to language model 305A. The processor(s) 125C may provide the sets of embeddings 520 to reference memory 525 for storage at reference memory 525. The processor(s) 125C may (e.g., upon receiving enhanced query data 240C from a dynamic query enhancement microservice) may retrieve the sets of embeddings 520 from reference memory 525 and may provide the sets of embeddings 520 to language model 305A. Additionally, the processor(s) 125C may provide the enhanced query data 240C to language model 305A.

It should be noted that the processor(s) 125C, without deviating from the scope of the present disclosure, may be an example of processor(s) 125B as described with reference to FIG. 3, processor(s) 125A as described with reference to FIG. 2, and/or processor(s) 125 as described with reference to FIG. 1. Additionally, or alternatively, language model 305A may be an example of a language model as described with reference to FIG. 3. Additionally, or alternatively, enhanced query data 240C may be an example of enhanced query data 240B as described with reference to FIG. 4, enhanced query data 240A as described with reference to FIG. 3, and/or enhanced query data 240 as described with reference to FIG. 2.

1.40 Digital Agents

One or more computers executing a respective digital agent (e.g., one of digital agents 140A, 140B, 140C, and 140C) may function to automatically execute one or more computer-based operations based on receiving the enhanced query data. The term "computer-based operations" may refer, in some examples, to generating a response to unrefined query data and transmitting the response to an interactive agent querying interface 115.

Each digital agent may have electronic access to one or more data sources (e.g., computer data sources). For instance, digital agent 140A may have electronic access to data sources 145A and 145B (e.g., via communication connection 147A), digital agent 140B may have electronic access to data source 145B (e.g., via communication connection 147B), digital agent 140C may have electronic access to data source 145C (e.g., via communication connection 147C), and digital agent 140D may have electronic access to data source 145D (e.g., via communication connection 147D). It should be noted that the digital agents depicted in FIG. 1 are exemplary and that a fewer or greater number of digital agents may be used in adaptive query data processing service 105 without deviating from the scope of the present disclosure. Additionally, the communication connections between a digital agent and its respective data source(s) may vary from that depicted in FIG. 1 without deviating from the scope of the present disclosure (e.g., some digital agents may have more than 2 data sources to which they have electronic access).

Each of digital agents 140A through 140D may have a respective one or more agent-specific processors. The term "agent-specific processor" may refer to the processor for a particular digital agent being distinct to that digital agent (e.g., the processor is not used by another digital agent or dedicated to one digital agent). Alternatively, there may be examples in which digital agents share one or more processors without deviating from the scope of the present disclosure (e.g., processor(s) 125 perform one or more functionalities associated with the agent-specific processors for one or more digital agents). The one or more agent-specific processors may include a single processing unit, or, alternatively, may encompass multiple processing units that function in parallel or independently. In embodiments where multiple processors are utilized, these processors may reside on the same physical host system or may be distributed across multiple host systems, potentially located in geographically disparate locations.

Each of digital agents 140A through 140D may further include a respective one or more agent-specific memories. The term "agent-specific memory" may refer to the memory for a particular digital agent being distinct to that digital agent (e.g., the memory is not used by another digital agent or is dedicated to one digital agent). Alternatively, there may be examples in which digital agents share one or more memories without deviating from the scope of the present disclosure. The one or more agent-specific memories may function to store information used by the one or more agent-specific processors. For instance, the one or more agent-specific memories may store textual data used in constructing a language model prompt.

In some examples, each of digital agents 140A through 140D may have a communication connection with a respective language model. Without deviating from the scope of the present disclosure, it should be noted that there may be examples in which multiple digital agents may have a respective communication connection with a shared language model. Alternatively, it should be noted that there may be examples in which each digital agent includes a respective language model.

Figure 4:
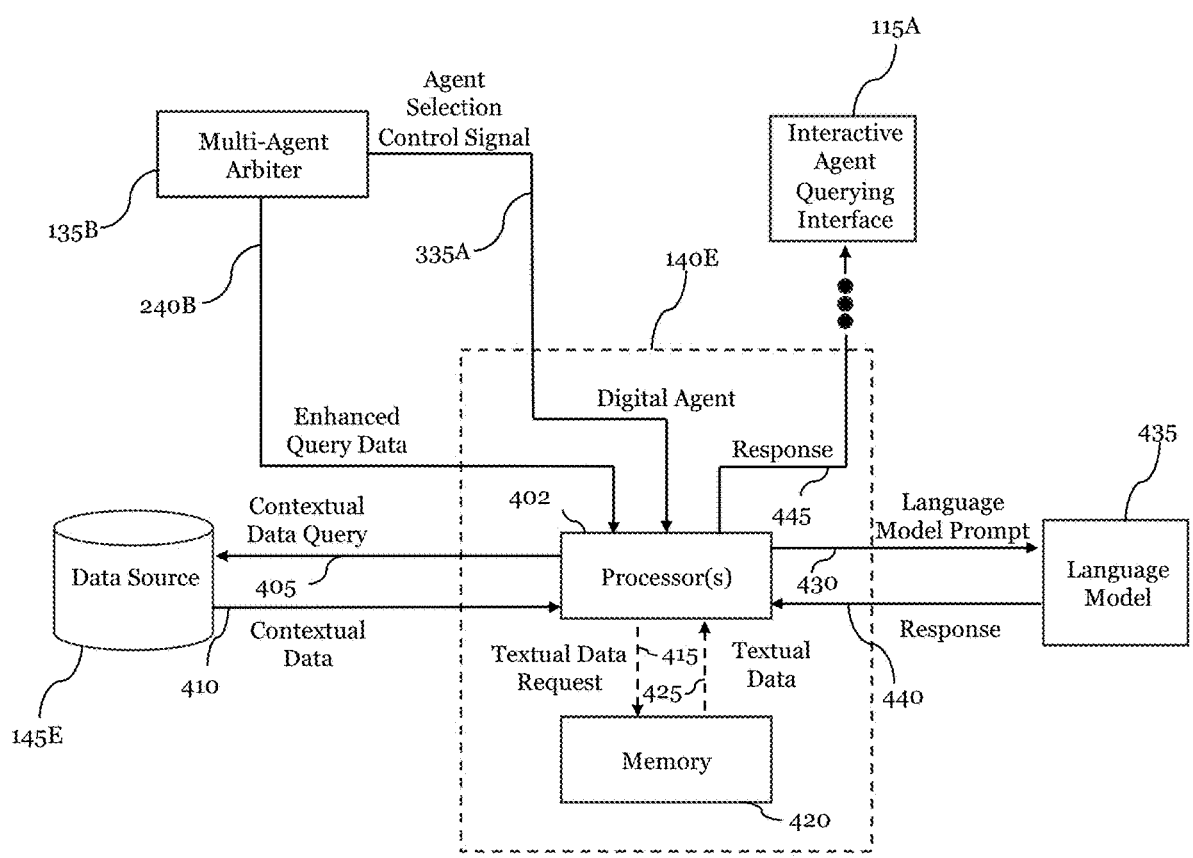
FIG. 4 illustrates an example digital agent response generation procedure 400 in accordance with one or more embodiments of the present application.

In a non-limiting example, as depicted with reference to FIG. 4, a digital agent 140E may include agent-specific processor(s) 402 and agent-specific memory 420. Additionally, digital agent 140E may have a respective communication connection with each of multi-agent arbiter 135B, interactive agent querying interface 115A, data source 145E, and language model 435. In some examples, digital agent 140E may be an example of one of digital agents 140A through 140D as described with reference to FIG. 1; multi-agent arbiter 135B may be an example of multi-agent arbiter 135A as described with reference to FIG. 3 and/or multi-agent arbiter 135 as described with reference to FIG. 1; interactive agent querying interface 115A may be an example of an interactive agent querying interface 115 as described with reference to FIG. 1; and data source 145E may be an example of one or more of data sources 145A through 145D as described with reference to FIG. 1.

Instantiating a Digital Agent

After multi-agent arbiter 135 selects digital agent 140A, multi-agent arbiter 135 may transmit an agent selection control signal to digital agent 140A. Additionally, multi-agent arbiter 135 may forward enhanced query data to digital agent 140A. The enhanced query data and the agent selection control signal may be received by the one or more agent-specific processors of digital agent 140A. Receiving the agent selection control signal and/or the enhanced query data may instantiate digital agent 140A. Instantiating digital agent 140A may refer to triggering the one or more agent-specific processors from an inactive state to an active state. In an active state, the one or more agent-specific processors may perform steps as described herein to generate a digital response to unrefined query data.

Both the agent selection control signal and the enhanced query data may be forwarded over communication connection 137A. Alternatively, each of the agent selection control signal and the enhanced query data may be transmitted over separate communication connections. It should be further noted that there may be examples where the agent selection control signal may include the enhanced query data.

In a non-limiting example, as described with reference to FIG. 4, multi-agent arbiter 135B may provide enhanced query data 240B and agent selection control signal 335A to digital agent 140E (e.g., to agent-specific processor(s) 402). It should be noted that enhanced query data 240B may be an example of enhanced query data 240A as described with reference to FIG. 3 and/or enhanced query data 240 as described with reference to FIG. 2. Additionally, or alternatively, agent selection control signal 335A may be an example of agent selection control signal 335 as described with reference to FIG. 3.

Retrieving Contextual Data

Upon receiving the agent selection control signal and/or the enhanced query data, the one or more agent-specific processor(s) of digital agent 140A may access the data within data source 145A and/or data source 145B. For instance, the one or more agent-specific processor(s) may construct a contextual data query to be provided to data source 145A and/or data source 145B. In some examples, constructing the contextual data query may include converting the enhanced query data to a set of embeddings and adding, to the contextual data query, the set of embeddings of the enhanced query data.

The one or more agent-specific processor(s) of digital agent 140A may perform a search of data source 145A and/or data source 145B using the contextual data query. In some examples, data sources 145A and/or 145B may each be a vector database. In such examples, the one or more agent-specific processor(s) of digital agent 140A may perform the search by one or more indexing techniques (e.g., ANN) that enables vectors similar to a provided vector to be found without searching each entry of the vector database. Upon finding a similar enough vector within data sources 145A and/or 145B to the vector of the enhanced query data, digital agent 140A may extract textual content corresponding to the found vector.

In a non-limiting example, as described with reference to FIG. 4, agent-specific processor(s) 402, upon receiving enhanced query data 240B may construct a contextual data query 405 and perform a search of data source 145E. Based on performing the search, the agent-specific processor(s) 402 may receive contextual data 410 from the data source 145E.

Constructing a Language Model Prompt

Upon receiving the contextual data from data source 145A and/or 145B, the agent-specific processor(s) of digital agent 140A may construct a language model prompt from the enhanced query data and the contextual data. The language model prompt may include tokens of the enhanced query data and contextual data, if present.

In some examples, the language model prompt may include additional textual data retrieved from the one or more agent-specific memories of digital agent 140A. For instance, the one or more agent-specific processors of digital agent 140A may retrieve, from the one or more agent-specific memories, first textual data including a first textual description of a role of the selected digital agent and second textual data including a second textual description of a set of rules for the selected digital agent to follow (e.g., an indication of allowed and/or prohibited behaviors for the digital agent). The one or more agent-specific processors of digital agent 140A may further construct the language model prompt from the first textual data and the second textual data. For instance, the language model prompt may include tokens of the first textual data and the second textual data.

In a non-limiting example, as described with reference to FIG. 4, agent-specific processor(s) 402, upon receiving enhanced query data 240B and contextual data 410 may construct language model prompt 415. Additionally, agent-specific processor(s) 402 may retrieve, from agent-specific memory 420, textual data 425 that may be included in the language model prompt 415. The textual data 425 may include a first textual description of a role of the selected digital agent and/or a second textual description of a set of rules for the selected digital agent to follow. In some examples, to request the textual data 425, agent-specific processor(s) 402 may construct a textual data request 415 and may provide the textual data request 415 to memory 420.

Generating a Response to Unrefined Query Data

Upon constructing the language model prompt, digital agent 140A (e.g., via the one or more agent-specific processors) may provide the language model prompt to the respective language model over the respective communication connection for digital agent 140A. The language model 435 may output a response to the unrefined query data, which the one or more agent-specific processors of the digital agent 140A may receive. Digital agent 140A may provide the response to the unrefined query to interactive agent querying interface 115 (e.g., via communication connection 142, which may be implemented by a network of computers).

In a non-limiting example, as depicted with reference to FIG. 4, agent-specific processor(s) 402 may provide language model prompt 430 to language model 435. Language model 435 may output a response 440, which processor(s) 402 may receive. Processor(s) 402 may provide the response 445 to interactive agent querying interface 115A via a computer network.

Digital Agent Tasks

In some examples, digital agents 140A through 140D may perform dedicated tasks based on a reception of an agent selection control signal from a multi-agent arbiter 135. For instance, one or more of digital agents 140A through 140D may generate a digital artifact (e.g., a report) that may be logged or provided to the interactive agent querying interface 115. Additionally, or alternatively, one or more of digital agents 140A through 140D may perform user account management (e.g., creating an account, updating an account, deleting an account). In some examples, the dedicated tasks may be performed in real-time.

1.45 Data Sources

Adaptive query data processing service 105 may include a set of data sources electronically accessible by one or more digital agents (e.g., data sources 145A, 145B, 145C, and 145D). In some examples, each of data sources 145A through 145D may be a vector database. Additionally, or alternatively, each of data sources 145A through 145D may be a tabular database (e.g., a SQL database), a non-tabular database (e.g., a NoSQL database), a knowledge base, or an unstructured digital artifact (e.g., an unstructured document). Each of data sources 145A through 145D may store contextual data.

Each of digital agents 140A through 140D may be specifically permissioned to particular data sources. For instance, digital agent 140A may be specifically permissioned to data sources 145A and 145B; digital agent 140B may be specifically permissioned to data source 145B; digital agent 140C may be specifically permissioned to data source 145C; and digital agent 140D may be specifically permissioned to data source 145D. The term "specifically permissioned" may refer to a particular digital agent having access to a limited subset of total available data sources.

In some examples, a data source may include user-specific information. In such examples, a digital agent accessing the data source may construct a language model prompt only from contextual data corresponding to the user that sent a particular unrefined query. To accomplish this, the digital agent may filter out contextual data associated with other users (e.g., contextual data linked to a user identifier different from a user identifier of the user that sent a particular unrefined query) and may retain contextual data associated with the user (e.g., contextual data linked to a user identifier of the user that sent a particular refined query). In other examples, a data source may include data accessible to multiple users (e.g., common information for all users). When accessing such a data source, the digital agent may refrain from filtering out contextual data according to a user identifier.

1.50 Authentication Module

One or more computers executing authentication module 150 may function to limit the information that adaptive query data processing service 105 uses in generating a response to unrefined query data according to the user linked to a particular unrefined query data. For instance, when unrefined query data is received via communication connection 117, a signal including the unrefined query data may further include an identifier of a user that transmitted the unrefined query data. Authentication module 150, via a communication connection 152 to processor(s) 125 may extract, from the unrefined query data, the identifier of the user and may provide an indication to dynamic query enhancement microservice 120 and/or digital agents 140A through 140D to limit information retrieved to that linked to the extracted user identifier. Accordingly, when processor(s) 125 search entries of the computer database for dynamic query enhancement microservice 120, the processor(s) 125 may filter out historical user dialogue data linked to user identifiers distinct from the extracted user identifier and may keep historical user dialogue data linked to the same user identifier. Accordingly, each instance of the historical user dialogue data may have a corresponding entry in the computer database with the identifier of the user. Additionally, when digital agents 140A through 140D search a data source (e.g., data sources 140A through 140D), the digital agents 140A through 140D may filter out contextual data linked to user identifiers distinct from the extracted user identifier and may keep contextual data linked to the same user identifier.

3. Computer-Implemented Method and Computer Program Product

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A system for query-enhanced digital agent selection within a multi-digital agent architecture, the system comprising:
   one or more processors;
   a graphical user interface module rendering, via a computer network, an interactive agent querying interface for receiving unrefined query data;
   a dynamic query enhancement microservice comprising:
      a first operable communication connection to the one or more processors of the system that:
         obtain the received unrefined query data from the interactive agent querying interface;
         convert the unrefined query data to a set of embeddings;
         construct a database search query using the set of embeddings and one or more logical search parameters;
         execute a search of a computer database using the database search query;
         extract historical user dialogue data from the computer database based at least in part on executing the search; and construct a rephrasing engine prompt using the extracted historical user dialogue data and the unrefined query data; and transmit the rephrasing engine prompt to a rephrasing engine;

the rephrasing engine comprising an operable communication connection to a first language model that transforms the unrefined query data to enhanced query data restructured based on processing the rephrasing engine prompt, wherein the dynamic query microservice transmits the enhanced query data output by the rephrasing engine to the multi-agent arbiter;

the multi-agent arbiter communicably interposed between the dynamic query enhancement microservice and a plurality of digital agents, the multi-agent arbiter in selective operable control of the plurality of distinct agents, the multi-agent arbiter comprising:

a second language model that generates at least one digital agent selection inference based on an input of an agent selection prompt comprising at least the enhanced query data;

one or more memories specially encoded with executable digital agent selection logic; and a second operable communication connection to the one or more processors of the system that:

receive the enhanced query data from the multi-agent arbiter;

process the enhanced query data via the second language model to generate the at least one digital agent classification inference;

extract the executable digital agent selection logic from the one or more memories; and apply the executable digital agent selection logic to the at least one digital agent classification inference;

wherein the multi-agent arbiter converts the at least one digital agent classification inference to an agent selection control signal that, when executed by the one or more processors of the system, instantiates a selected digital agent of the plurality of digital agents for automatically executing one or more computer-based operations based on receiving the enhanced query data; and a plurality of computer data sources electronically accessible to the plurality of digital agents, wherein:

the selected digital agent of the plurality of digital agents is specifically permissioned to one computer data source of the plurality of data sources, the selected digital agent generates a response to the unrefined query data based on a processing of the enhanced query data against data accessed within the one computer data source, and the response is transmitted over the computer network to the interactive agent querying interface.

2. The system according to claim 1, wherein the system further comprises:

the plurality of digital agents, each of the plurality of digital agents comprising:

a respective one or more agent-specific processors that:

access the data within the one computer data source to which the selected digital agent is permissioned; and construct a language model prompt from the accessed data and the enhanced query data;

provide the language model prompt to the digital agent; and a respective operable communication connection to a respective third language model, wherein the respective third language model of the selected digital agent generates the response to the unrefined query data based on processing the language model prompt, and wherein the digital agent transmits the response to the interactive agent querying interface.

3. The system according to claim 2, wherein the system further comprises:

one or more memories electronically accessible to the plurality of digital agents, wherein the one or more agent-specific processors of the selected digital agent further:

retrieve, from the one or more memories, first textual data comprising a first textual description of a role of the selected digital agent;

retrieve, from the one or more memories, second textual data comprising a second textual description of a set of rules for the selected digital agent to follow, wherein the language model prompt is further constructed from the first textual description and the second textual description.

4. The system according to claim 1, wherein the system further comprises:

one or more memories electronically accessible to the multi-agent arbiter, wherein the one or more processors of the system further:

retrieve, from the one or more memories and for each digital agent of the plurality of digital agents, respective textual data comprising a description of the digital agent; and provide, to the second language model, the respective textual data for each of the plurality of digital agents.

5. The system according to claim 4, wherein the system further comprises:

one or more reference memories electronically accessible to the second language model, wherein the one or more processors of the system further:

retrieve, from the second language model, sets of embeddings based at least in part on providing the respective textual data for each of the plurality of digital agents to the second language model;

store the sets of embeddings at the one or more reference memories;

retrieve the sets of embeddings from the one or more reference memories;

provide, to the second language model, the sets of embeddings, wherein processing the enhanced query data via the second language model to generate the at least one digital agent classification inference is based at least in part on the provided sets of embeddings.

6. The system according to claim 1, wherein the one or more processors further:

store the unrefined query data and the set of embeddings at the computer database.

7. The system according to claim 1, wherein the one or more processors further:

convert the response to the unrefined query data to a second set of embeddings; and store the response to the unrefined query data and the second set of embeddings at the computer database.

8. The system according to claim 1, wherein the graphical user interface module:

provides, to the interactive agent querying interface, a display section that displays textual data of the unrefined query data and the response to the unrefined query data;

provides, to the interactive agent querying interface, a user interface input element that stores the textual data of the unrefined query data when manipulated by user input; and provides, to the interactive agent querying interface, a user interface control element that triggers transmission of the unrefined query data when manipulated by user input.

9. The system according to claim 1, wherein the selected digital agent and a second digital agent of the plurality of digital agents are each specifically permissioned to the one computer data source of the plurality of data sources.

10. The system according to claim 1, wherein:
the selected digital agent of the plurality of digital agents is specifically permissioned to the one computer data source and another computer data source of the plurality of computer data sources, and
the selected digital agent generates the response to the unrefined query data based on a processing of the enhanced query data against the data accessed within the one computer data source and additional data accessed within the other computer data source.

11. The system according to claim 1, wherein:
the data accessed within the one computer data source comprises user-specific information,
a second digital agent of the plurality of digital agents is specifically permissioned to another computer data source of the plurality of computer data sources distinct from the one computer data source, and
data stored within the other computer data source is accessible for multiple users.

12. The system according to claim 1, further comprising:
an authentication module comprising:
a third operable communication connection to the one or more processors of the system that:
extract, from the unrefined query data, an identifier of a user of the interactive agent querying interface, wherein searching the computer database comprises searching entries of the computer database that have the identifier of the user, and wherein each instance of the historical user dialogue data has a corresponding entry in the computer database with the identifier of the user.

13. An adaptive query data processing service that is implemented by a network of distributed computers, comprising:
one or more processors;
a graphical user interface module rendering, via a computer network, an interactive agent querying interface for receiving unrefined query data;
a dynamic query enhancement microservice comprising:
a first operable communication connection to the one or more processors of the adaptive query data processing service that:
obtain the received unrefined query data from the interactive agent querying interface;
convert the unrefined query data to a set of embeddings;
construct a database search query using the set of embeddings and one or more logical search parameters;
execute a search of a computer database using the database search query;
extract historical user dialogue data from the computer database based at least in part on executing the search; and
construct a rephrasing engine prompt using the extracted historical user dialogue data and the unrefined query data; and
transmit the rephrasing engine prompt to a rephrasing engine;
the rephrasing engine comprising an operable communication connection to a first language model that transforms the unrefined query data to enhanced query data restructured based on processing the rephrasing engine prompt, wherein the dynamic query microservice transmits the enhanced query data output by the rephrasing engine to the multi-agent arbiter;
the multi-agent arbiter communicably interposed between the dynamic query enhancement microservice and a plurality of digital agents, the multi-agent arbiter in selective operable control of the plurality of distinct agents, the multi-agent arbiter comprising:
a second language model that generates at least one digital agent selection inference based on an input of an agent selection prompt comprising at least the enhanced query data;
one or more memories specially encoded with executable digital agent selection logic; and
a second operable communication connection to the one or more processors of the adaptive query data processing service that:
receive the enhanced query data from the rephrasing engine;
process the enhanced query data via the second language model to generate the at least one digital agent classification inference;
extract the executable digital agent selection logic from the one or more memories; and
apply the executable digital agent selection logic to the at least one digital agent selection inference;
wherein the multi-agent arbiter converts the at least one digital agent selection inference to an agent selection control signal that, when executed by the one or more processors of the adaptive query data processing service, instantiates a selected digital agent of the plurality of digital agents for automatically executing one or more computer-based operations based on receiving the enhanced query data; and
a plurality of computer data sources electronically accessible to the plurality of digital agents, wherein:
the selected digital agent of the plurality of digital agents is specifically permissioned to one computer data source of the plurality of data sources,
the selected digital agent generates a response to the unrefined query data based on a processing of the enhanced query data against data accessed within the one computer data source, and
the response is transmitted over the computer network to the interactive agent querying interface.

14. The adaptive query data processing service according to claim 13, further comprising:
the plurality of digital agents, each of the plurality of digital agents comprising:
a respective one or more agent-specific processors that:
access the data within the one computer data source to which the selected digital agent is permissioned; and construct a language model prompt from the accessed data and the enhanced query data;

provide the language model prompt to the digital agent; and a respective operable communication connection to a respective third language model, wherein the respective third language model of the selected digital agent generates the response to the unrefined query data based on processing the language model prompt, and wherein the digital agent transmits the response to the interactive agent querying interface.

15. The adaptive query data processing service according to claim 14, further comprising:

one or more agent-specific memories electronically accessible to the selected digital agent, wherein the one or more agent-specific processors of the selected digital agent further:

retrieve, from the one or more agent-specific memories, first textual data comprising a first textual description of a role of the selected digital agent;

retrieve, from the one or more agent-specific memories, second textual data comprising a second textual description of a set of rules for the selected digital agent to follow, wherein the language model prompt is further constructed from the first textual description and the second textual description.

16. The adaptive query data processing service according to claim 13, further comprising:

one or more memories electronically accessible to the multi-agent arbiter, wherein the one or more processors of the adaptive query data processing service further:

retrieve, from the one or more memories and for each digital agent of the plurality of digital agents, respective textual data comprising a description of the digital agent; and provide, to the second language model, the respective textual data for each of the plurality of digital agents.

17. The adaptive query data processing service according to claim 13, further comprising:

one or more reference memories electronically accessible to the second language model, wherein the one or more processors of the adaptive query data processing service further:

retrieve, from the second language model, sets of embeddings based at least in part on providing the respective textual data for each of the plurality of digital agents to the second language model;

store the sets of embeddings at the one or more reference memories;

retrieve the sets of embeddings from the one or more reference memories;

provide, to the second language model, the sets of embeddings, wherein processing the enhanced query data via the second language model to generate the at least one digital agent classification inference is based at least in part on the provided sets of embeddings.

18. The adaptive query data processing service according to claim 13, wherein the one or more processors further:
store the unrefined query data and the set of embeddings at the computer database.

19. The adaptive query data processing service according to claim 13, wherein the one or more processors further:

convert the response to the unrefined query data to a second set of embeddings; and store the response to the unrefined query data and the second set of embeddings at the computer database.

20. A computer-implemented system for query-enhanced digital agent selection within a multi-digital agent architecture, the system comprising:

one or more processors;

a computer-readable medium operably coupled to the one or more processors, the computer-readable medium having computer-readable instructions stored thereon that, when executed by the one or more processors, cause a computing device to perform operations comprising:

obtaining, via a computer network, unrefined query data from an interactive agent querying interface rendered by a graphical user interface module;

converting the unrefined query data to a set of embeddings;

constructing a database search query using the set of embeddings and one or more logical search parameters;

executing a search of a computer database using the database search query;

extracting historical user dialogue data from the computer database based at least in part on executing the search;

constructing a rephrasing engine prompt using the extracted historical user dialogue data and the unrefined query data;

transmitting, to a rephrasing engine, the rephrasing engine prompt;

receiving, from the rephrasing engine, enhanced query data, the enhanced query data restructured from the unrefined query data;

processing the enhanced query data via a language model to generate at least one digital agent classification inference based at least in part on an input of an agent selection prompt comprising at least the enhanced query data to the language model;

extracting executable digital agent selection logic from one or more memories specially encoded with the executable digital agent selection logic;

applying the executable digital agent selection logic to the at least one digital agent selection inference;

converting the at least one digital agent selection inference to an agent selection control signal based at least in part on applying the executable digital agent selection logic;

executing the agent selection control signal to instantiate a selected digital agent of a plurality of digital agents for automatically executing one or more computer-based operations based on receiving the enhanced query data;

transmitting the enhanced query data to the selected digital agent;

retrieving, from the selected digital agent, a response to the unrefined query data based at least in part on providing the enhanced query data to the selected digital agent; and transmitting, via the computer network, the response to the unrefined query data to the interactive agent querying interface.

* * * * *